Feb. 2, 1937.  V. W. KLIESRATH  2,069,253
WHEEL
Filed Aug. 25, 1933
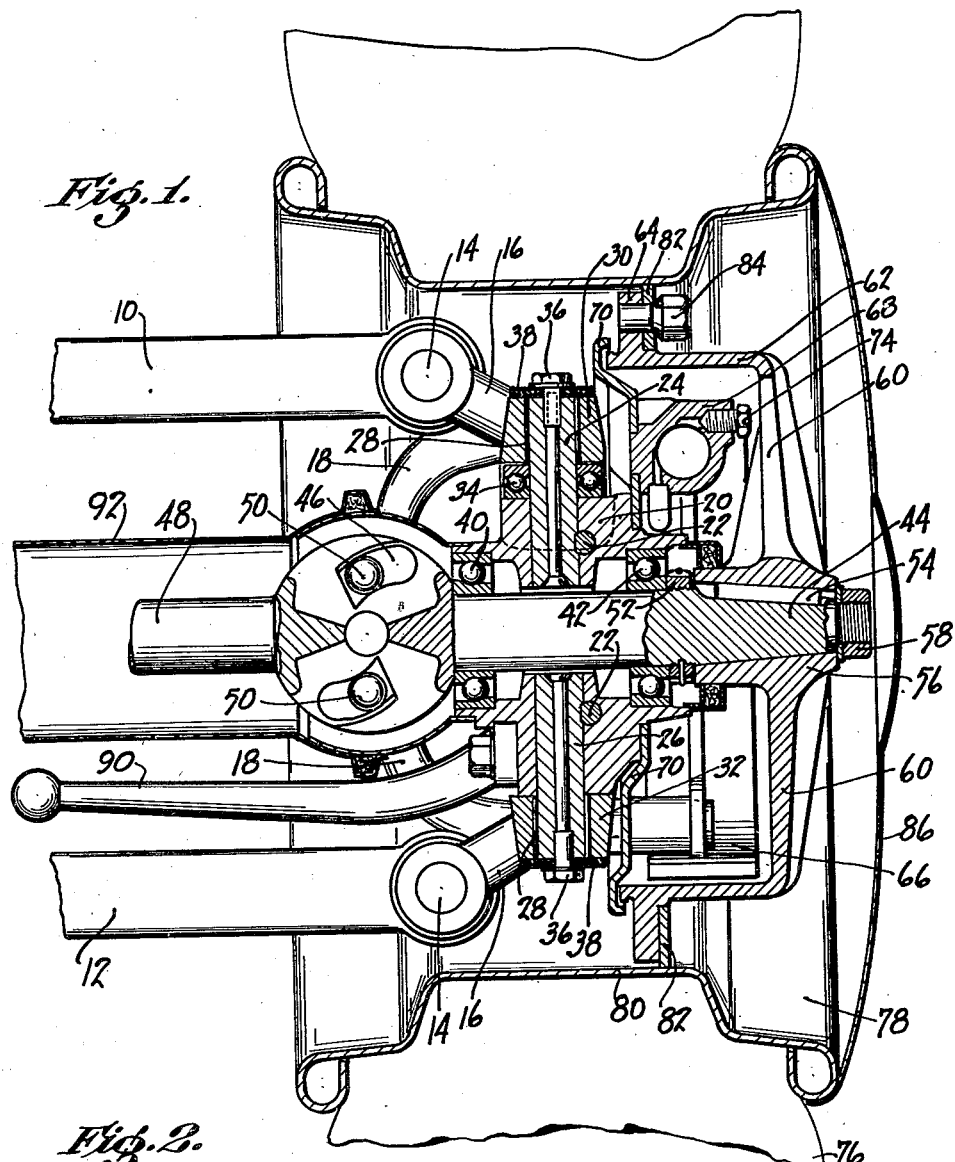
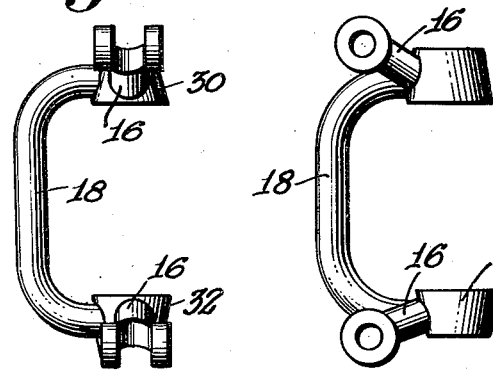
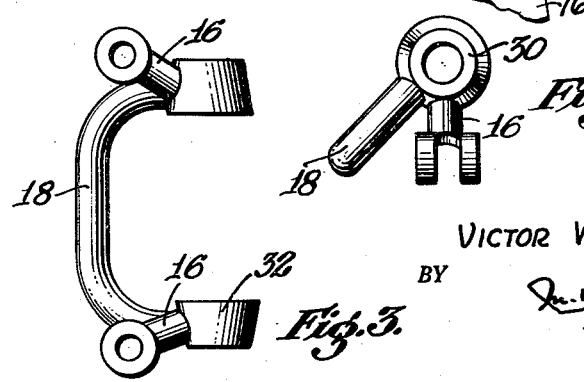
INVENTOR.
VICTOR W. KLIESRATH
BY
ATTORNEY.

Patented Feb. 2, 1937

2,069,253

UNITED STATES PATENT OFFICE 2,069,253

WHEEL

Victor W. Kliesrath, South Bend, Ind., assignor to The Steel Wheel Corporation, Chicago, Ill., a corporation of New York Application August 25, 1933, Serial No. 686,722

4 Claims. (Cl. 180—43)

This invention relates to wheels and their mountings, and to the associated parts of a motor vehicle, and is illustrated as embodied in a novel stream-lined swiveled front wheel and brake assembly for an automobile.

An object of the invention is to provide a simple and compact structure which can be effectively stream-lined for use in a high-speed automobile, especially a front-drive car having individually-sprung wheels, and the compactness of which permits the use of a novel type of rim which is unusually wide and yet of small diameter, so that low-pressure tires of very large size (e. g. superballoon tires) may be used.

Having this object in mind, the invention comprises a novel wheel assembly and parts thereof arranged to give the necessary extreme compactness, and preferably including within itself a brake assembly forming part of a four-wheel brake system. In the arrangement illustrated, the above-described large-section tire is mounted on a novel rim, preferably of the drop-center type, to the outer face of which there is snapped or otherwise secured a cover disk which merges into the curve of the tire and streamlines the entire assembly.

The rim is shown with an inwardly-projecting flange near its outer side on the drop-center portion of the rim, this flange being demountably secured to an external peripheral rib at the free edge of the peripheral cylindrical braking flange of a rotatably mounted brake drum. This drum preferably has relatively large openings in its head, through which the brake assembly within the drum may conveniently be inspected and adjusted when the above-described stream-lined cover disk is removed.

In the particular arrangement illustrated, the drum has a central attaching portion mounted on and keyed to the end of a drive shaft journaled in anti-friction bearings mounted in a novel manner in a tubular horizontal support. The support, in the case of a front wheel, has vertical pivots journaled in upper and lower bearings in a bowed member formed for attachment to axle sections forming part of the spring suspension for individually springing the wheels.

The above and other objects and features of the invention, including various novel combinations of parts and desirable particular constructions, will be apparent from the following description of the illustrative embodiment shown in the accompanying drawing, in which:

Figure 1 is a transverse vertical section through the left front wheel and associated parts, looking toward the rear of the car;

Figure 2 is an elevation of the wheel supporting member;

Figure 3 is a side elevation of the wheel supporting member at right angles to Figure 2; and Figure 4 is a top view of the wheel supporting member.

In the illustrated arrangement, as more fully disclosed and claimed in my prior application No. 651,821, filed January 14, 1933, of which the present application is as to all subject-matter claimed a continuation, the novel wheel assembly herein claimed is intended to be arranged at the outer ends of, and to support, upper and lower substantially parallel axle sections 10 and 12, having at their ends eyes sleeved on pivots 14 by which the axle sections are connected to arms 16 at the upper and lower ends of a vertically arranged novel bowed wheel-supporting member 18.

Member 18 is bowed rearwardly and inwardly of the car, to clear a horizontal tubular member 20 which has, attached thereto by keys 22 or the like, upper and lower pivots 24 and 26 journaled in needle bearings 28 in bearings 30 and 32 formed in the upper and lower ends of the bowed member 18.

A thrust ball bearing 34 is sleeved on the pivot 24 between the upper face of the tubular member 20 and the lower face of the bearing 30, and takes the load of the car. The pivots 24 and 26 may be made hollow, to form lubricant passages closed by plugs 36 screwed into their ends and holding felt washers or the like 38.

The opposite ends of the tubular member 20 are formed with annular shoulders, against which are seated inner and outer ball bearings 40 and 42 in which is rotatably mounted a drive shaft 44. The shaft 44 has at its inner end an enlarged head which holds the ball bearing 40 against its shoulder, and which is provided with inclined grooves 46 cooperating with similar oppositely-inclined grooves in the head of a driving shaft 48 to receive the balls 50 of a "Weiss" universal joint. A nut 52 threaded on the shaft 44 holds the bearing 42 seated against its shoulder.

The end of the shaft 44 is tapered, and formed with a slot for a key 54, by which means it has mounted thereon the tapered central hub 56 of a rotatably mounted brake drum held thereon by means such as a nut 58 threaded on the end of the shaft 44. The head of the brake drum is in the form of means having an opening through which the brake may readily be adjusted, and is shown as including three or four spokes 60, cast integrally with the hub 56 and an external peripheral braking flange 62 having rim-attaching means such as an external attaching rib 64 near its free edge.

Between the spokes 60 there are spaces affording easy access to a brake assembly arranged within the above-described brake drum. The illustrated assembly includes friction shoes 66 actuated by a hydraulic cylinder device 68, all carried by a support such as a backing plate 70 detachably bolted to the tubular member 20. The brake assembly illustrated is a standard commercial hydraulic brake, except that the bleeder plug 74 of the hydraulic cylinder is arranged on the outer side of the cylinder where it is accessible between the spokes 60.

The tire 76 of the wheel is a superballoon tire, of very large cross-section and low pressure (e. g. 10 or 12 pounds per square inch or even less, or at any rate less than 20 pounds per square inch), and in this case is of relatively small interior diameter. This tire is mounted on a very wide and small-diameter rim 78, preferably of the drop-center type provided with a central "drop-center" channel 80 which facilitates changing tires on the rim.

The rim 78 has welded or otherwise secured thereto, near the outer side of the drop-center channel 80 and projecting inwardly of the rim, a flange 82 detachably connected by bolts or other fastenings 84 to the attaching rib 64 of the brake drum.

According to an important feature of the invention, the entire assembly is covered and streamlined by a cover disk 86 or the like, shaped to merge into the curvature of the large-section tire 76, and which is snapped over the outer edge of the rim 78 or otherwise secured in place. The tire is of the type sometimes called a streamlined tire, whose greatest width is almost at its base, thus increasing its stability and cooperating with disk 86 to stream-line the entire assembly.

It should be especially noted that the swiveling axis of the wheel, i. e. the axis of pivots 24 and 26 and bearings 30 and 32, is in the central load plane of the tire 76 and rim 78. The brake assembly 66—70 is on the outer side of this plane and the universal joint 50 is on the inner side.

The type of joint shown (i. e. the "Weiss" type), as is well known, permits the shafts 44 and 48 to have any necessary relative axial movement, and to be at various angles to each other as the wheel is swiveled in steering, while the joint nevertheless at all times drives the shaft 44 at the same angular velocity as the shaft 48.

The wheel may be swiveled by means such as a steering arm 90 bolted or otherwise secured to (or integral with) the tubular member 20. This arm forms part of the steering mechanism described and claimed in my prior application No. 677,611, filed June 26, 1933. The shafts 48 and 44 and the joint 50 may be inclosed in a housing 92 more fully described in my prior application No. 651,821, filed January 14, 1933.

While one compact and streamlined wheel assembly has been described in detail, it is not my intention to limit the scope of the invention by that description, or otherwise than by the terms of the appended claims.

I claim:

1. A vehicle wheel assembly comprising a bowed member having upper and lower coaxial bearings, a horizontal tubular member having upper and lower pivots journaled in said bearings, spaced anti-friction bearings in said tubular member on opposite sides of said pivots and seated against oppositely-facing annular shoulders in the ends of said member, a horizontal shaft journaled in said bearings and having an enlarged inner end lying at the side of the inner of said bearings remote from the pivots and forming part of a driving universal joint and which engages and holds against its shoulder the inner one of said anti-friction bearings and which shaft has mounted thereon an adjustable member engaging and holding against its shoulder the outer one of said anti-friction bearings, and a road wheel mounted on the outer end of said shaft.

2. A vehicle wheel assembly comprising a relatively wide rim having a relatively small diameter and having an inwardly-projecting flange near its outer side, a rotatable brake drum within said rim having means adjacent the edge of its braking flange and which means is demountably connected to said inwardly-projecting flange, a central horizontal tubular member rotatably carrying a drive shaft on the end of which is mounted said drum and which tubular member carries a brake assembly within said drum, a support within said rim having upper and lower vertically coaxial bearings, upper and lower pivots detachably secured to said member and journaled in said bearings respectively for permitting the member to swivel relatively to the support about an axis in the central load plane of the rim, and a horizontal driving shaft normally alined with and universally jointed to said drive shaft.

3. A vehicle wheel assembly comprising a rim, a vertically-extending wheel supporting member within said rim and having upper and lower coaxial bearings substantially in the central plane of said rim, and means pivotally mounted in said bearings and carrying said rim, said member including upper and lower parallel pivot mountings lying within said rim for the ends of upper and lower axle sections.

4. A vehicle wheel assembly comprising a rim, a vertically-extending wheel supporting member within said rim and having upper and lower coaxial bearings substantially in the central plane of said rim, said member including upper and lower parallel pivot mountings lying within said rim for the ends of upper and lower axle sections, a horizontal member having upper and lower pivots journaled in said upper and lower bearings, and a shaft rotatably mounted in said horizontal member and carrying said rim.

VICTOR W. KLIESRATH.